United States Patent
Tsuchiya

(10) Patent No.: US 8,947,832 B2
(45) Date of Patent: Feb. 3, 2015

(54) BEARING DEVICE AND SWING ARM ASSEMBLY FOR MAGNETIC DISK

(75) Inventor: Kunihiro Tsuchiya, Miyota-machi (JP)

(73) Assignee: Minebea Co., Ltd., Nagano (JP)

( * ) Notice: Subject to any disclaimer, the term of this patent is extended or adjusted under 35 U.S.C. 154(b) by 277 days.

(21) Appl. No.: 12/977,694

(22) Filed: Dec. 23, 2010

(65) Prior Publication Data

US 2011/0157743 A1    Jun. 30, 2011

(30) Foreign Application Priority Data

Dec. 24, 2009 (JP) .................................. 2009-292129

(51) Int. Cl.
| | | |
|---|---|---|
| *G11B 5/55* | (2006.01) | |
| *F16C 25/06* | (2006.01) | |
| *G11B 5/48* | (2006.01) | |
| *F16C 35/077* | (2006.01) | |

(52) U.S. Cl.
CPC .............. *F16C 25/06* (2013.01); *G11B 5/4813* (2013.01); *F16C 35/077* (2013.01); *F16C 2370/12* (2013.01)
USPC .................. 360/265.2; 360/265.3; 360/265.4; 360/265.5; 360/265.6

(58) Field of Classification Search
USPC ................................. 360/97.01, 265.2–265.6
See application file for complete search history.

(56) References Cited

U.S. PATENT DOCUMENTS

| 5,473,489 | A  | * | 12/1995 | Sanada ...................... 360/265.6 |
| 6,128,165 | A  | * | 10/2000 | Baker et al. ................ 360/265.6 |
| 6,525,910 | B1 | * | 2/2003  | Macpherson et al. ..... 360/265.6 |
| 2002/0085780 | A1 | | 7/2002 | Muraki et al. |
| 2005/0248886 | A1 | * | 11/2005 | Culver ....................... 360/265.6 |

FOREIGN PATENT DOCUMENTS

| JP | A-04-266613   | 9/1992  |
| JP | 2002-157848 A | 5/2002  |
| JP | 2002-327765 A | 11/2002 |

OTHER PUBLICATIONS

Sep. 18, 2013 Office Action issued in Japanese Application No. 2009-292129 (with English Translation).

* cited by examiner

*Primary Examiner* — Wayne Young
*Assistant Examiner* — Carlos E Garcia
(74) *Attorney, Agent, or Firm* — Oliff PLC

(57) ABSTRACT

A bearing device includes a shaft having an axis, plural rolling bearings arranged at axially separated positions and rotatably supporting the shaft, a first cylindrical member for supporting the rolling bearings therein and having a first screw on a part of an outer surface thereof, a second cylindrical member having a second screw engaging with the first screw on an inner surface thereof and mounted to the outer surface of the first cylindrical member by engaging the first screw with the second screw, a restricting member provided on the outer surface of the second cylindrical member for preventing relative axial movement of the second cylindrical member with respect to the first cylindrical member when a portion of the second member contacts the restricting member.

18 Claims, 3 Drawing Sheets

BEARING DEVICE AND SWING ARM ASSEMBLY FOR MAGNETIC DISK

RELATED APPLICATIONS

This application claims priority under 35 U.S.C. §119 to Japanese Patent Application No. 2009-292129 filed on Dec. 24, 2009, the entire content of which is hereby incorporated by reference.

BACKGROUND OF THE INVENTION

1. Field of the Invention

The present invention relates to a bearing device and a swing arm assembly for a magnetic disk, in which resonance frequency can be finely adjusted.

2. Description of the Related Art

In some kinds of bearings, resonance frequency can be adjusted. For example, Japanese Patent Application, First Publication No. 2002-327765, discloses a bearing unit which is press-inserted between a shaft and a sleeve and is fixed thereto while measuring axial resonance frequency, whereby axial frequency may be adjusted to a predetermined value.

Japanese Patent Application, First Publication No. 2002-157848, discloses a bearing structure for supporting an arm for a magnetic disc in which a stepped portion is provided on an outer surface of a housing of a bearing unit or on an inner surface of the arm. In the structure, the stepped portion is provided for separating the bearing device from the arm, whereby external force exerted to a bearing and change of torque are reduced, thereby reducing torque.

SUMMARY OF THE INVENTION

According to Japanese Patent Application, First Publication No. 2002-327765, since the bearing unit is fixed while measuring axial frequency, adjustment of axial frequency cannot be performed after assembly. In view of these circumstances in the art, an object of a present invention is to provide a bearing device in which adjustment of resonance frequency can be performed after assembly thereof.

A first aspect of the present invention provides a bearing device including: a shaft having an axis; plural rolling bearings arranged at axially separated positions and rotatably supporting the shaft; a first cylindrical member for supporting the rolling bearings therein and having a first screw on a part of an outer surface thereof; a second cylindrical member having a second screw engaging with the first screw on an inner surface thereof and mounted to the outer surface of the first cylindrical member by engaging the first screw with the second screw; a restricting member provided on the outer surface of the inner member and preventing relative axial movement of the second cylindrical member with respect to the first cylindrical member when a portion of the second cylindrical member contacts the restricting member.

According to a first aspect of the present invention, in a condition in which the second cylindrical member is engaged with the first cylindrical member by screw and abuts the restricting member, distance between the rolling bearings is affected by an adjustment of tightening torque of the second cylindrical member with respect to the first cylindrical member which results in change of the resonance frequency. Therefore, the resonance frequency of the bearing device can be adjusted by adjusting the tightening torque, and this adjustment of resonance frequency can be performed after assembly of the bearing device.

According to a second aspect of the present invention, in accordance with the first aspect, a gap is provided between an outer surface of the first cylindrical member and an inner surface of the second cylindrical member except for a portion in which the first and the second screws are engaging.

According to the second aspect of the invention, the external force external force applied to the second cylindrical member does not directly act on the first cylindrical member due to the gap provided between the outer surface of the first cylindrical member and the inner surface of the second cylindrical member. Therefore, deformation of outer rings of rolling bearings provided at the inside of the first cylindrical member and deformation of raceway grooves on the outer rings are inhibited, and a structure in which the variation of rotating torque of the bearing device caused by the deformation is minimized can be obtained.

According to a third aspect of the present invention, in accordance with the second aspect, the resonance frequency can be adjusted by adjustment of tightening torque of the second cylindrical member with respect to the first cylindrical member, and the thickness of at least a part of the portion of the first cylindrical member forming the gap is changed, whereby the adjusting range of resonance frequency is defined.

According to a fourth aspect of the present invention, in one of the first to third aspects, a swing arm assembly includes a swing arm for a magnetic disc and a bearing device rotatably supporting the swing arm for the magnetic disc.

According to a fifth aspect of the present invention, in one of the first to third aspects, a swing arm assembly includes a swing arm for a magnetic disc, a bearing device rotatably supporting the swing arm for the magnetic disc and a screw wherein an end portion is contacting the outer surface of the second cylindrical member for mounting the swing arm with the bearing device.

According to the first aspect of the present invention, the bearing device in which fine adjustment can be performed after assembly can be obtained.

According to the second aspect of the present invention, a bearing device can be obtained in which the variation of rotating torque caused by an external force acting on the second cylindrical member is minimized.

According to the third aspect of the present invention, the bearing device having a wider adjusting range of resonance frequency can be obtained.

According to the fourth aspect of the invention, the swing arm assembly provides the same advantages described in the first aspect.

According to the fifth aspect, swing arm assembly having the same advantages of the first aspect and also having a small variation of rotating torque caused by the screw for mounting the swing arm can be obtained.

DETAILED DESCRIPTION OF THE PREFERRED EMBODIMENTS

1. First Embodiment

Structure of Bearing Device

Figure 1:
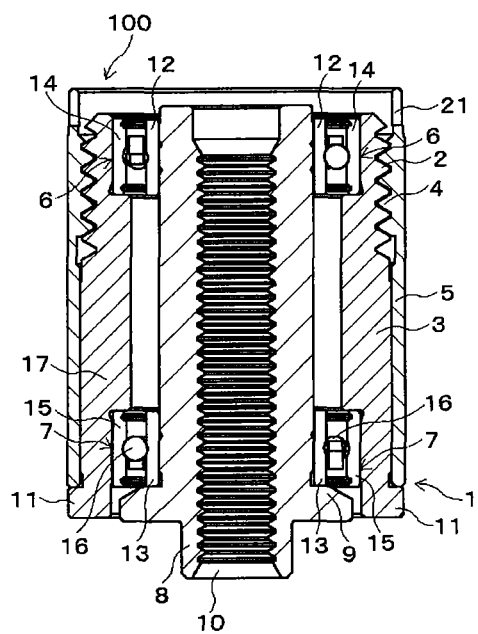
FIG. 1 is a schematic cross-sectional view of a bearing device for a pivot assembly in accordance with a first embodiment of the present invention.

FIG. 1 shows a bearing device 100 for a pivot assembly in accordance with a first embodiment of the invention. The bearing device 100 for the pivot assembly supports a rotating shaft of a swing arm mounted with a magnetic head for a magnetic disk device at a front end thereof. A female screw 10 is formed in the axial center of the shaft 8, and the shaft 8 is fixed to a base (not shown) of a magnetic disc device by using the female screw 10. The swing arm (not shown) is mounted to an outer member 5 (explained later) and is rotatable with respect to the shaft 8.

The shaft 8 is rotatably supported in the inside of an inner member 3 having a cylindrical shape by rolling bearings 6 and 7 which are disposed at axially separated locations. The rolling bearings 6 and 7 are preferably ball bearings. An inner ring 12 of the rolling bearing 6 and an inner ring 13 of the rolling bearing 7 are fixed to the outer surface of the shaft 8, and an outer ring 14 of the rolling bearing 6 and an outer ring 15 of the rolling bearing 7 are fixed to the inner surface of the inner member 3. A flange 9 is formed at the end (the lower side in FIG. 1) of the outer surface of the shaft 8, whereby the shaft 8 is prevented from moving axially (toward the upper direction in FIG. 1).

A spacer 17 for locating the rolling bearings 6 and 7 at the axially separated positions is provided on the inner surface of the inner member 3. The inner diameter of the spacer 17 is reduced and the upper and lower sides thereof contact the outer rings 14 and 15, whereby the bearings 6 and 7 are axially located.

A male screw 2 is formed at a position in the vicinity of the upper end of the outer surface of the inner member 3 and a female screw 4 located on the inner surface of the cylindrical outer member 5 is engaged with the male screw 2. The female screw 4 is also located at a location in the vicinity of the upper end of the inner surface of the outer member 5. Thus, the outer member 5 is mounted to the inner member 3 by the screw structure.

The outer member 5 is fastened and mounted to the inner member 3 by the screw structure, thereby unifying the inner member 3 and the outer member 5 and constructing a sleeve assembly 1. The sleeve assembly 1 supported by a pair of the rolling bearings 6 and 7 is relatively rotatable with respect to the shaft 8.

A flange 11 is provided at a position in the vicinity of the lower end of the outer surface of the inner member 3. When the outer member 5 is rotated around the inner member 3 and is fastened thereto, the lower end surface of the outer member 5 abuts the flange 11, and the flange 11 prevents the outer member 5 from axial movement toward the lower direction with respect to the inner member 3.

A slit 21 in which an end portion of a torque driver (not shown) is inserted is formed at a location in the vicinity of the upper end of the outer surface of the outer member 5. The end portion of the torque driver is inserted into the slit 21 and the outer member 5 is rotated around the inner member 3, whereby the outer member 5 is tightened up to the inner member 3 by the screw action. Resonance frequency of the bearing device 100 is adjusted according to the tightening torque controlled by the torque driver. The details of adjusting resonance frequency will be explained later.

The inner diameter of the outer member 5 except for the female screw 4 is larger than the outer diameter of the inner member 3 except for the male screw 2. Thus, a gap with few tens micrometers is provided between the inner surface of the outer member 5 and the outer surface of the inner member 3 except for the male screw 2.

Assembling Method for Bearing Device

An example of methods for assembling the bearing device 100 is explained as follows. First, the outer member 5 is screwed to the outer surface of the inner member 3, and the sleeve assembly 1 is assembled. An adhesive is applied on a lower portion of the outer surface of the shaft 8 formed with the flange 9. Then, the end surface of the inner ring 13 of the rolling bearing 7 is abutted on the flange 9, and the inner ring 13 is closely fitted to the outer surface of the shaft 8. The adhesive may be selected from such adhesives as ultraviolet-curing adhesive, an anaerobic adhesive or a thermosetting adhesive.

An adhesive is applied at the upper portion of the inner surface of the inner member 3 formed with the flange 11 on the lower side of the outer surface. The end surface of the outer ring 14 of the rolling bearing 6 is abutted on the upper stepped portion of the spacer 14, and the outer ring 14 is closely fitted into the inner surface of the inner member 3. An adhesive is applied on the upper portion of the outer surface of the shaft 8 and the lower portion of the inner surface of the inner member 3, and the inner ring 12 is closely fitted to the upper portion of shaft 8, moreover, the outer ring 15 of the rolling bearing 7 is simultaneously closely fitted into the lower portion of the inner surface of the inner member 3.

In the above condition, the end surface of the inner ring 12 closely fitted to the upper portion of the shaft 8 is axially (toward the lower direction) pressured, and the adhesive is hardened while maintaining pressure. The pressure applied to the end surface of the inner ring 12 necessary to provide the required resonance frequency is previously determined experimentally.

Adjustment of Resonance Frequency

The bearing device 100 for the pivot assembly assembled according to the above method is expected to have the specified resonance frequency. However, in practice, the above assembling method shows wide variation of resonance frequency, and bearing devices not having specified resonance frequency are frequently found in mass production.

In order to solve the above problem, resonance frequency of the bearing device 100 for the pivot assembly of the first embodiment can be adjusted after the assembly. Resonance frequency is adjusted by adjusting the tightening torque of the outer member 5 in relation to the inner member 3.

As a specific method, the tightening torque of the outer member 5 to the inner member 3 is adjusted by inserting the end portion of the torque driver to the slit 21 provided at the upper portion of the outer surface of the outer member 5 in a condition in which the lower end surface of the outer member 5 is abutted on the flange 11 of the inner member 3 (condition in FIG. 1) fixed to a jig.

In the above operation, if the tightening torque is increased and the outer member 5 is strongly tightened to the inner member 3, the radially outer portion of the inner member 3 is axially compressed due to engagement of the screws, because the outer member 5 is prevented from axial movement by the flange 11. As a result, reaction force against the pressure in the radially outer portion of the inner member 3 is generated in the radially inner portion thereof, whereby the distance between the rolling bearing 6 and 7 is axially enlarged (for example, may be increased by a few micrometers). Such an action works inversely when the tightening torque of the outer member 5 in relation to the inner member 3 is decreased, i.e., the distance between the rolling bearing 6 and 7 is axially reduced.

Resonance frequency changes when the axial distance between the rolling bearings 6 and 7 changes. Therefore, resonance frequency of the bearing device 100 for the pivot assembly can be adjusted by adjusting the tightening torque of the outer member 5 to the inner member 3 with the torque driver.

In practical operation, resonance frequency of the bearing device 100 for the pivot assembly assembled by the above method is measured by a measuring equipment based on FTT analysis. When the measured value is out of a specified range of resonance frequency, the end portion of the torque driver is inserted into the slit 21 provided at the upper portion of the outer member 5 in order to adjust the tightening torque of the outer member 5 with respect to the inner member 3, and resonance frequency is adjusted to be within the specified range.

After adjusting resonance frequency, an adhesive is applied to the end portion of the male screw 2 or the female screw 4, and is cured to fix the outer member 5 and the inner member 3 to each other in order to prevent any change of the adjusted resonance frequency.

As explained above, resonance frequency of the bearing device 100 for the pivot assembly can be adjusted after assembly. Therefore, the bearing device for the pivot assembly having resonance frequency with small deviation and controlled quality can be produced. In other words, bearing devices with high accuracy in resonance frequency can be produced.

Evaluation

Ten samples of the bearing devices provided by the above method were prepared, and resonance frequencies were measured. Values of resonance frequency of the samples were set within a range between 9.500 kHz±1.250 kHz during assembly. Resonance frequency setting during assembly was performed by applying proper axial pressure to the inner ring 12 while curing the adhesive in the above production process.

In the following Table 1, measured values of resonance frequency are shown. In Table 1, "before adjustment" means a value of resonance frequency measured before adjusting the tightening torque of the outer member 5 in relation to the inner member 3. "After adjustment" means a value measured after adjusting the tightening torque of the outer member 5 in relation to the inner member 3 (that is, adjustment of resonance frequency after assembly). It should be noted that adjusting the tightening torque of the outer member 5 in relation to the inner member 3 was performed in such a way that the resonance frequency falls within the range of 9.800 kHz±0.650 kHz.

TABLE 1

| No. | value (kHz) before adjustment | value (kHz) after adjustment |
| --- | --- | --- |
| 1 | 9.088 | 9.704 |
| 2 | 9.152 | 9.696 |
| 3 | 9.248 | 9.696 |
| 4 | 9.280 | 9.632 |
| 5 | 9.280 | 9.620 |
| 6 | 8.760 | 9.680 |
| 7 | 9.960 | 10.016 |
| 8 | 9.568 | 9.920 |
| 9 | 9.536 | 10.080 |
| 10 | 9.600 | 9.924 |

TABLE 1-continued

| No. | value (kHz) before adjustment | value (kHz) after adjustment |
| --- | --- | --- |
| Maximum | 9.960 | 10.080 |
| Minimum | 8.760 | 9.620 |
| Difference | 1.200 | 0.460 |

As shown in Table 1, in the samples before adjustment, the difference between the maximum value of resonance frequency and the minimum value of resonance frequency is as large as 1.200 kHz. In contrast, in the samples after adjustment, the difference between the maximum value of resonance frequency and the minimum value of resonant frequency is as small as 0.460 kHz. Therefore, this result confirms that the bearing devices for the pivot assembly having resonance frequency with small variation can be obtained by adjusting the tightening torque of the outer member 5 in relation to the inner member 3 and, consequently, adjusting the resonance frequency after assembly.

Variation

The thickness of the spacer 17 may be changed, whereby adjustable range of resonance frequency can be made wider. Therefore, the bearing device for the pivot assembly in which the difference between the maximum and the minimum values of resonance frequency is further reduced can be provided.

Figure 3:
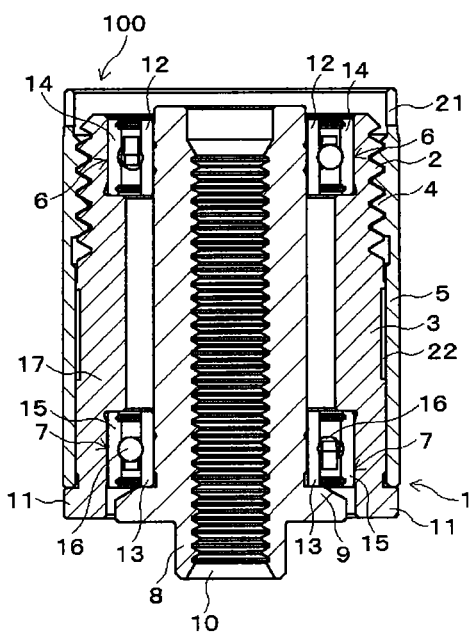
FIG. 3 is a schematic cross-sectional view of a bearing device for the pivot assembly in accordance with a variation of the first embodiment.

Moreover, as shown in FIG. 3, a groove 22 may be provided on the outer surface of the inner member 3 so as to change the thickness of the spacer 17, whereby resonance frequency can be adjusted. In this case, the groove 22 may be located at a position at which an end of a screw for fixing the swing arm (explained in the second embodiment) points toward the groove 22. With this structure, a change of rotational torque of bearing device caused by tightening the screw can be prevented.

According to FIG. 1, the number of rolling bearing is not limited to two, and it may be three or more. The flange 11 is not restricted to be provided all around the surface of the inner member 3, but may be partially provided.

In FIG. 1, an example of the bearing device supporting the shaft of a swing arm of a magnetic disc device is shown. However, the bearing device of present invention is not restricted to support the shaft of the swing arm of a magnetic disc device, but may be applied to multiple uses in which such a bearing device is required.

2. Second Embodiment

Figure 2:
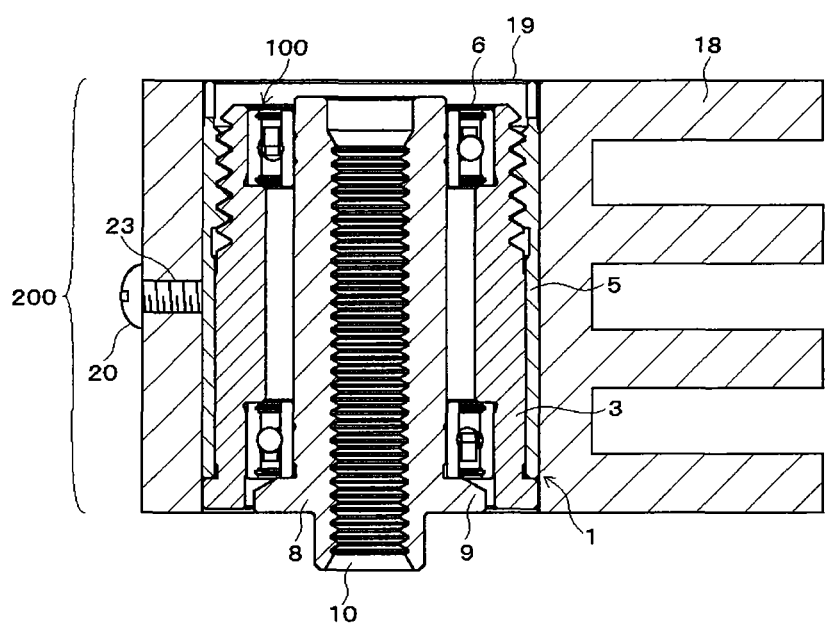
FIG. 2 is a schematic cross-sectional view of a swing arm assembly for a magnetic disk installed with the bearing device for the pivot assembly in accordance with a second embodiment.

A swing arm assembly 200 is shown in FIG. 2. In a magnetic disc device, the swing arm of the swing arm assembly 200 is rotatably supported by a bearing device 100 for a pivot assembly. The swing arm of the magnetic disc device swings with a very small amplitude at a high speed, and it is required to access a target track at a high speed with high positioning accuracy. Therefore the bearing device is required to have high accuracy. Since the movement of the swing arm is affected by resonance frequency of the bearing device, the deviation of resonance frequency of the bearing device is required to be small. Moreover, change of rotational torque should be as small as possible when the swing arm is mounted to the bearing.

In the swing arm assembly 200 shown in FIG. 2, an arm 18 is mounted to the bearing device 100 for the pivot assembly shown in FIG. 1. The arm 18 is mounted with a magnetic head (not shown) at its front end which is used for writing and reading information from the magnetic disc.

A through hole 19 is provided in the axis of the arm 18. The bearing device 100 for the pivot assembly shown in FIG. 1 is fitted into the through hole 19. Numeral 23 indicates a tapped hole penetrating the through hole 19. A screw 20 is screwed into the tapped hole 23 and is tightened after the bearing device 100 for the pivot assembly is fitted into the through hole 19 of the arm 18, whereby the bearing assembly 100 is assembled to the arm 18. In the above operation, the end of the screw 20 abuts on the bearing device 100 for the pivot assembly at the outer surface of the outer member 5. The abutting point is located at the portion corresponding to the gap formed between the inner member 3 and the outer member 5 in FIG. 1, avoiding the portion in which the male screw 2 and female screw 4 is engaged.

The bearing device 100 for the pivot assembly is mounted to a base of the magnetic disc device (not shown) by the female screw 10. Therefore, the arm 18 is rotatable with respect to the base of the magnetic disc device via the shaft 8 by function of rolling bearings 6 and 7.

As explained according to FIG. 1, the bearing device 100 for the pivot assembly includes the inner member 3 and the outer member 5 which is tightened thereto. A gap of a few tens of micrometers is provided between the inner member 3 and the outer member 5 except for the portion where the male screw 2 and the female screw 4 are engaged.

As shown in FIG. 2, when the screw 20 is tightened up, the end of the screw 20 abuts on the outer surface of the outer member 5, whereby the outer member 5 is pushed toward the axis. The inner member 3 does not receive the direct action of the pushing force because of the existence of the gap. Therefore, the deformation by tightening the screw 20 of the outer rings 14 and 15 of the rolling bearings 6 and 7 of the bearing device 100 for the pivot assembly is minimized, and the deformation of raceway of the outer rings 14 and 15 is also minimized, whereby change of rotational torque caused by the deformation is minimized. That is, the bearing device 100 for the pivot assembly in which the change of rotational torque caused by tightening the screw 20 is minimized can be obtained.

Evaluation

Effects on the rotational torque caused by tightening the screw 20 in the swing arm assembly 20 were measured. The results of the measurements are shown hereinafter. In the structure of the swing arm of the comparative example, the inner member 3 and the outer member 5 were not provided individually but were provided as one member. Accordingly, the male screw 2, female screw 4 and other portions of the gap were not provided therein. The remaining members of structure were the same as in the swing arm assembly 200.

Table 2 shows the relationships between tightening torque of the screw 20 and rotational torque of the swing arm in the comparative example and the swing arm assembly 200 (described as "second embodiment" in Table 2). The result of measurement is an average value of ten samples. The rotational torque corresponds to the resistance generated when the swing arm is rotated by an external force. If the rotating torque varies, range and speed of movement of the swing arm vary even if external force is constant, whereby accurate positioning and speed of swing arm cannot be expected. Therefore, change in the rotational torque should be avoided.

TABLE 2

|  |  | initial value 0.1 kgf·cm | tightening at 2.0 kgf·cm | | tightening at 3.0 kgf·cm | |
| --- | --- | --- | --- | --- | --- | --- |
|  |  | rotational torque (gcm) | rotational torque (gcm) | increasing rate (times) | rotational torque (gcm) | increasing rate (times) |
| Comparative example | average | 0.405 | 1.743 | 4.3 | 2.907 | 7.2 |
| Second embodiment | average | 0.493 | 0.765 | 1.5 | 0.953 | 1.9 |

Table 2 shows the results of measured values of rotational torque of the swing arm. The measurement was performed for three levels of tightening torque of the screw 20, namely 0.1 kgf·cm, 2.0 kgf·cm and 3.0 kgf·cm. As is clearly shown in Table 2, rotational torque of the swing arm is increased by increasing tightening torque of the screw 20. In this case, the rotational torque of the swing arm of the comparative example was increased at a very high rate compared to the second embodiment.

The reason for the above result in the comparative example may be explained as follows. In the comparative example, since the outer rings 14 and 15 of the rolling bearings 6 and 7 are directly pressured by external force, deformation of the outer rings 14 and 15 and deformation of the raceways of the outer rings 14 and 15 are increased, whereby the rotational torque is greatly affected.

On the other hand, in the structure of the second embodiment, a gap is provide between the inner member 3 and the outer member 5, and the outer member 5 is pressured by external force from the screw 20, whereby external force toward the inner member 3 is eased by the gap. Therefore, deformation of the outer rings 14, 15 and raceway grooves of the outer rings 14 and 15 can be minimized, and as a result, changing of rotational torque can be prevented.

Thus, variation of the rotational torque caused by assembling the swing arm 18 can be minimized, and a high speed access to the target track with high positioning accuracy can be achieved.

The present invention can be applied to bearing structures and varieties of products using these bearing structures.

What is claimed is:
1. A bearing device comprising:
a shaft having an axis;
plural rolling bearings arranged at axially separated positions and rotatably supporting the shaft;
a first cylindrical member for supporting the rolling bearings on an inner surface thereof and having a first screw formed on an outer surface thereof;
a second cylindrical member having a second screw formed on an inner surface thereof and mounted to the outer surface of the first cylindrical member by engagement of the first screw with the second screw; and
a restricting member provided on the outer surface of the first cylindrical member for preventing relative axial movement of the second cylindrical member with respect to the first cylindrical member when a portion of the second cylindrical member contacts the restricting member, wherein the first cylindrical member and the second cylindrical member form a sleeve assembly, and the sleeve assembly is supported by the plural rolling bearings and is relatively rotatable with respect to the shaft, and the first screw and the second screw are fixed to each other by an adhesive.

2. The bearing device according to claim 1, wherein a resonance frequency thereof is adjustable by adjusting a tightening torque of the second cylindrical member with respect to the first cylindrical member.

3. The bearing device according to claim 1, wherein a gap is provided between the outer surface of the first cylindrical member and the inner surface of the second cylindrical member except for a portion in which the first screw and the second screw are engaged.

4. The bearing device according to claim 3, wherein a resonance frequency thereof is adjustable by an adjustment of a tightening torque of the second cylindrical member with respect to the first cylindrical member, and a thickness of at least a part of a portion of the first cylindrical member forming the gap is changed, whereby an adjustable range of resonance frequency is obtained.

5. A swing arm assembly for a magnetic disc, comprising:
a swing arm for the magnetic disc; and
a bearing device according to claim 1 rotatably supporting the swing arm.

6. A swing arm assembly for a magnetic disc, comprising:
a swing arm for the magnetic disc; and
a bearing device according to claim 1 rotatably supporting the swing arm;
wherein an end portion of a screw for mounting the swing arm to the bearing device contacts the outer surface of the second cylindrical member.

7. The bearing device according to claim 1, wherein the second cylindrical member is composed of one member.

8. The bearing device according to claim 1, wherein the restricting member of the first cylindrical member is a flange provided at one end side of the outer surface of the first cylindrical member,
the first screw of the first cylindrical member is formed at another end side of the outer surface of the first cylindrical member,
the portion of the second cylindrical member is an end surface of one end side of the second cylindrical member, and
when a tightening torque is increased and the second cylindrical member is strongly tightened to the first cylindrical member, the end surface of one end side of the second cylindrical member presses the flange of the one end side of the first cylindrical member toward a direction directed from the another end side to the one end side of the first cylindrical member.

9. The bearing device according to claim 4, wherein a groove is provided at the outer surface of the first cylindrical member, and the thickness of the first cylindrical member is adjusted by the groove of the first cylindrical member.

10. A bearing device comprising:
a shaft having an axis;
plural rolling bearings arranged at axially separated positions and rotatably supporting the shaft;
a first cylindrical member for supporting the rolling bearings on an inner surface thereof and having a first screw formed on an outer surface thereof;

a second cylindrical member having a second screw formed on an inner surface thereof and mounted to the outer surface of the first cylindrical member by engagement of the first screw with the second screw; and a restricting member provided on the outer surface of the first cylindrical member for preventing relative axial movement of the second cylindrical member with respect to the first cylindrical member when a portion of the second cylindrical member contacts the restricting member, wherein the first cylindrical member and the second cylindrical member form a sleeve assembly, and the sleeve assembly is supported by the plural rolling bearings and is relatively rotatable with respect to the shaft, the second cylindrical member is composed of one member, the restricting member of the first cylindrical member is a flange provided at one end side of the outer surface of the first cylindrical member, the first screw of the first cylindrical member is formed at another end side of the outer surface of the first cylindrical member, the portion of the second cylindrical member is an end surface of one end side of the second cylindrical member, and when a tightening torque is increased and the second cylindrical member is strongly tightened to the first cylindrical member, the end surface of one end side of the second cylindrical member presses the flange of the one end side of the first cylindrical member toward a direction directed from the another end side to the one end side of the first cylindrical member.

11. The bearing device according to claim 10, wherein a resonance frequency thereof is adjustable by adjusting the tightening torque of the second cylindrical member with respect to the first cylindrical member.

12. The bearing device according to claim 10, wherein a gap is provided between the outer surface of the first cylindrical member and the inner surface of the second cylindrical member except for a portion in which the first screw and the second screw are engaged.

13. The bearing device according to claim 12, wherein a resonance frequency thereof is adjustable by an adjustment of the tightening torque of the second cylindrical member with respect to the first cylindrical member, and a thickness of at least a part of a portion of the first cylindrical member forming the gap is changed, whereby an adjustable range of resonance frequency is obtained.

14. A swing arm assembly for a magnetic disc, comprising:
a swing arm for the magnetic disc; and
a bearing device according to claim 10 rotatably supporting the swing arm.

15. A swing arm assembly for a magnetic disc, comprising:
a swing arm for the magnetic disc; and
a bearing device according to claim 10 rotatably supporting the swing arm;
wherein an end portion of a screw for mounting the swing arm to the bearing device contacts the outer surface of the second cylindrical member.

16. The bearing device according to claim 10, wherein the first screw and the second screw are fixed to each other by an adhesive.

17. The bearing device according to claim 13, wherein a groove is provided at the outer surface of the first cylindrical member, and the thickness of the first cylindrical member is adjusted by the groove of the first cylindrical member.

18. A bearing device comprising:

a shaft having an axis;

plural rolling bearings arranged at axially separated positions and rotatably supporting the shaft;

a first cylindrical member for supporting the rolling bearings on an inner surface thereof and having a first screw formed on an outer surface thereof;

a second cylindrical member having a second screw formed on an inner surface thereof and mounted to the outer surface of the first cylindrical member by engagement of the first screw with the second screw;

a restricting member provided on the outer surface of the first cylindrical member for preventing relative axial movement of the second cylindrical member with respect to the first cylindrical member when an end surface of one end side of the second cylindrical member contacts the restricting member; and a slit provided at an end surface of another end side of the second cylindrical member, wherein the first cylindrical member and the second cylindrical member form a sleeve assembly, and the sleeve assembly is supported by the plural rolling bearings and is relatively rotatable with respect to the shaft, and the slit of the second cylindrical member is adapted to receive an end portion of a torque driver, such that a tightening torque of the second cylindrical member with respect to the first cylindrical member can be adjusted by the torque driver to thereby adjust a resonance frequency of the bearing device.

* * * * *